(12) United States Patent
Lee et al.

(10) Patent No.: US 9,457,807 B2
(45) Date of Patent: Oct. 4, 2016

(54) UNIFIED MOTION PLANNING ALGORITHM FOR AUTONOMOUS DRIVING VEHICLE IN OBSTACLE AVOIDANCE MANEUVER

(71) Applicants: GM GLOBAL TECHNOLOGY OPERATIONS LLC, Detroit, MI (US); CARNEGIE MELLON UNIVERSITY, Pittsburgh, PA (US)

(72) Inventors: Jin-Woo Lee, Rochester Hills, MI (US); Upali Priyantha Mudalige, Oakland Township, MI (US); Tianyu Gu, Pittsburgh, PA (US); John M. Dolan, Pittsburgh, PA (US)

(73) Assignees: GM Global Technology Operations LLC, Detroit, MI (US); Carnegie Mellon University, Pittsburgh, PA (US)

( * ) Notice: Subject to any disclaimer, the term of this patent is extended or adjusted under 35 U.S.C. 154(b) by 104 days.

(21) Appl. No.: 14/297,493

(22) Filed: Jun. 5, 2014

(65) Prior Publication Data

US 2015/0353082 A1 Dec. 10, 2015

(51) Int. Cl.
*B60W 30/09* (2012.01)
*B60W 30/10* (2006.01)
*B60W 10/20* (2006.01)

(52) U.S. Cl.
CPC ............. *B60W 30/09* (2013.01); *B60W 10/20* (2013.01); *B60W 30/10* (2013.01); *B60W 2550/402* (2013.01); *B60W 2720/10* (2013.01)

(58) Field of Classification Search
None
See application file for complete search history.

(56) References Cited

U.S. PATENT DOCUMENTS

| 8,170,739 | B2 | 5/2012 | Lee | |
|---|---|---|---|---|
| 2008/0208454 | A1* | 8/2008 | Pesterev | G01C 21/26 701/467 |
| 2010/0076685 | A1* | 3/2010 | Eidehall | G01S 13/931 701/301 |
| 2010/0082195 | A1 | 4/2010 | Lee et al. | |
| 2010/0106356 | A1* | 4/2010 | Trepagnier | G01S 17/023 701/25 |
| 2011/0098922 | A1* | 4/2011 | Ibrahim | B60W 40/08 701/532 |
| 2012/0022739 | A1* | 1/2012 | Zeng | B60W 30/12 701/41 |
| 2014/0032049 | A1* | 1/2014 | Moshchuk | B62D 15/0265 701/42 |
| 2014/0207364 | A1* | 7/2014 | Eidehall | B60W 30/09 701/301 |

FOREIGN PATENT DOCUMENTS

CN 104240530 A * 12/2014

* cited by examiner

*Primary Examiner* — John R Olszewski
*Assistant Examiner* — David Merlino
(74) *Attorney, Agent, or Firm* — John A. Miller; Miller IP Group, PLC

(57) ABSTRACT

A method for automated lane centering and/or lane changing purposes for a vehicle traveling on a roadway that employs roadway points from a map database to determine a reference vehicle path and sensors on the vehicle for detecting static and moving objects to adjust the reference path. The method includes reducing the curvature of the reference path to generate a reduced curvature reference path that reduces the turning requirements of the vehicle and setting the speed of the vehicle from posted roadway speeds from the map database. The method also includes providing multiple candidate vehicle paths and vehicle speeds to avoid the static and moving objects in front of the vehicle.

15 Claims, 10 Drawing Sheets

UNIFIED MOTION PLANNING ALGORITHM FOR AUTONOMOUS DRIVING VEHICLE IN OBSTACLE AVOIDANCE MANEUVER

BACKGROUND OF THE INVENTION

1. Field of the Invention

This invention relates generally to a system and method for providing vehicle path planning and generation for lane centering and/or lane changing in a semi-autonomous or autonomously driven vehicle and, more particularly, to a system and method for providing vehicle path planning and generation for lane centering and/or lane changing in a semi-autonomous or autonomously driven vehicle that uses roadway points from a map data base to determine a reference vehicle path and then inputs from various vehicle sensors to alter the reference path based on road curvature and detected obstacles.

2. Discussion of the Related Art

The operation of modern vehicles is becoming more autonomous, i.e., vehicles are able to provide driving control with less and less driver intervention. Cruise control systems have been on vehicles for a number of years where the vehicle operator can set a particular speed of the vehicle, and the vehicle will maintain at that speed without the driver operating the throttle. Adaptive cruise control systems have been recently developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems intervene if the driver makes harsh steering changes that may affect vehicle stability. Some vehicle systems attempt to maintain the vehicle near the center of a lane on the road. Further, fully autonomous vehicles have been demonstrated that can drive in simulated urban traffic up to 30 mph, observing all of the rules of the road.

As vehicle systems improve, they will become more autonomous with the goal being a complete autonomously driven vehicle. For example, future vehicles probably will employ autonomous systems for lane changing, passing, turns away from traffic, turns into traffic, etc. Smooth maneuvering and automated lane centering and lane changing control is important for driver and passenger comfort in autonomously driven vehicles. However, as a result of sensor and actuator latency, measured vehicle states may be different from actual vehicle states. This difference may cause improper path generation, which will affect lane changing harshness.

U.S. Pat. No. 8,170,739 issued May 1, 2012, titled, Path Generation Algorithm for Automated Lane Centering and Lane Changing Control System, assigned to the assignee of this application and herein incorporated by reference, discloses a system for providing path generation for automated lane center and/or lane changing purposes. The system employs one or more forward-looking cameras that detect lane markings in front of the vehicle for identifying a travel lane on which the vehicle is traveling. A desired path generation processor receives the signals from the camera, vehicle state information and a steering angle of the vehicle, and a request for a vehicle lane change. The system also includes a path prediction processor that predicts the vehicle path based on the vehicle state information including vehicle longitudinal speed, vehicle lateral speed, vehicle yaw-rate and vehicle steering angle. The desired path information and the predicted path information are compared to generate an error signal that is sent to a lane change controller that provides a steering angle signal to turn the vehicle and reduce the error signal, where the path generation processor employs a fifth order polynomial equation to determine the desired path of the vehicle based on the input signals.

U.S. Patent Application Publication No. 2010/0082195 to Lee et al., titled, Method to Adaptively Control Vehicle Operation Using an Autonomic Vehicle Control System, assigned to the assignee of this application and also herein incorporated by reference, discloses improvements to the path generation algorithm disclosed in the '739 patent that includes determining a preferred travel path for the vehicle based on a predicted travel path and an estimated roadway position.

Both the '739 patent and the '195 application employ vision cameras to detect roadway markings and objects in front of the vehicle for path generation purposes. However, current vehicle vision cameras have a maximum effective viewing distance of about 80 meters in good conditions, thus limiting their ability to detect roadway markings to determine roadway curvature. Particularly, a typical lane changing maneuver may require 5-6 seconds. For highway speeds, such as 70 mph, the camera range is often not sufficient to complete a lane change maneuver based on current calculation requirements. Therefore, the vehicle speed may exceed the ability of the system to accurately provide the necessary predicted path for semi-autonomous or autonomously driven vehicles.

SUMMARY OF THE INVENTION

The present disclosure describes a system and method for providing vehicle path planning and generation for automated lane centering and/or lane changing purposes and automated obstacle avoidance for a vehicle traveling on a roadway, where the method employs roadway points from a map database to determine a reference vehicle path and sensors on the vehicle for detecting static and moving objects and roadway lane markings to adjust the reference path. The method includes reducing the curvature of the reference path to generate a reduced curvature reference path that reduces the turning requirements of the vehicle and setting a reference speed of the vehicle from posted roadway speeds from the map database. The method also includes providing multiple candidate vehicle paths and vehicle speeds to avoid the static and moving objects in front of the vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing path planning and generation in a semi-autonomous or autonomously driven vehicle is merely exemplary in nature, and is in no way intended to limit the invention or its applications or uses.

Figure 1:
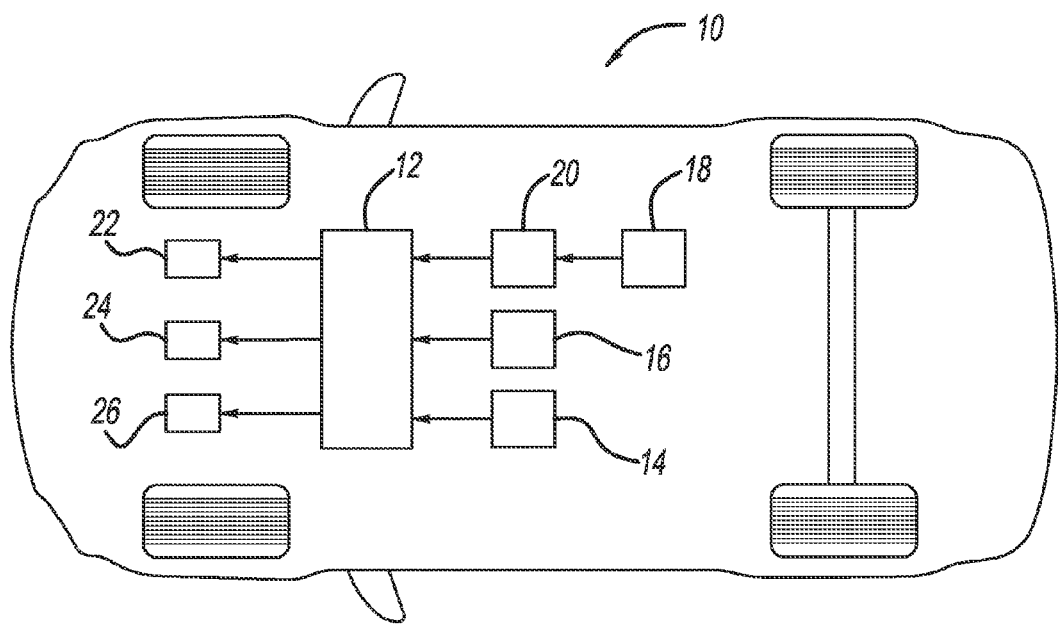
FIG. 1 is an illustration of a vehicle including components necessary for path prediction and generation in a semi-autonomous or autonomously driven vehicle.

FIG. 1 is an illustration of a vehicle 10 including a controller 12 that performs all of the necessary processes, calculations, algorithms, etc. discussed herein to provide path prediction, generation and control of the vehicle 10 driven in a semi-autonomous or autonomous manner, where the controller 12 can be any number of independent or combined processors, electronic control units (ECUs), devices, etc. The controller 12 receives signals from one or more forward looking vision cameras 14 that detect lane markings and objects on or in the roadway or otherwise in front of the vehicle 10, where the camera 14 can be any suitable detection device for this purpose, such as a charge-coupled device (CCD) camera, complementary metal oxide semiconductor (CMOS) video image sensors, etc. The vehicle 10 also includes a number of sensors, represented generally as sensor 16, that provides vehicle motion information including, but not limited to, vehicle speed, yaw-rate, steering angle, lateral and longitudinal acceleration, lateral and longitudinal speed, etc. The vehicle 10 further includes a GPS receiver 18 that receives GPS signals identifying the location of the vehicle 10, which are provided to a map database 20 that provides an indication to the controller 12 of the location of the vehicle 10 on the roadway, for example, as spaced apart roadway points. Based on the desired path of the vehicle 10 and whether the vehicle 10 is being semi-autonomously or autonomously driven, the controller 12 may provide output signals to a vehicle brake system 22, a vehicle throttle 24 and/or a vehicle steering system 26.

As mentioned above, the '739 patent employs a forward looking camera and a path prediction and generation algorithm, such as may be employed in the controller 12, to generate a desired vehicle path to maintain the vehicle 10 in the lane center and a path for lane changing purposes. The desired path is represented as a series of lateral offsets, heading angles and longitudinal distances over a certain time period. The controller 12 generates the desired path based on a predicted lane center using a fifth order polynomial equation. The fifth order polynomial equation has six unknowns at the beginning of the process for calculating the desired path. The normalized path problem is independent of the vehicle states, where the vehicle states are used for coordinate conversion for normalized coordinates to vehicle coordinates. Continuity assumptions are employed in the algorithm for a smooth path and include the start position and the orientation angle of the desired path aligned with the current vehicle position and the vehicle moving direction, where a lane change path should finish at the center of the destination lane and align with the lane in the first and second order derivatives.

Figure 2:
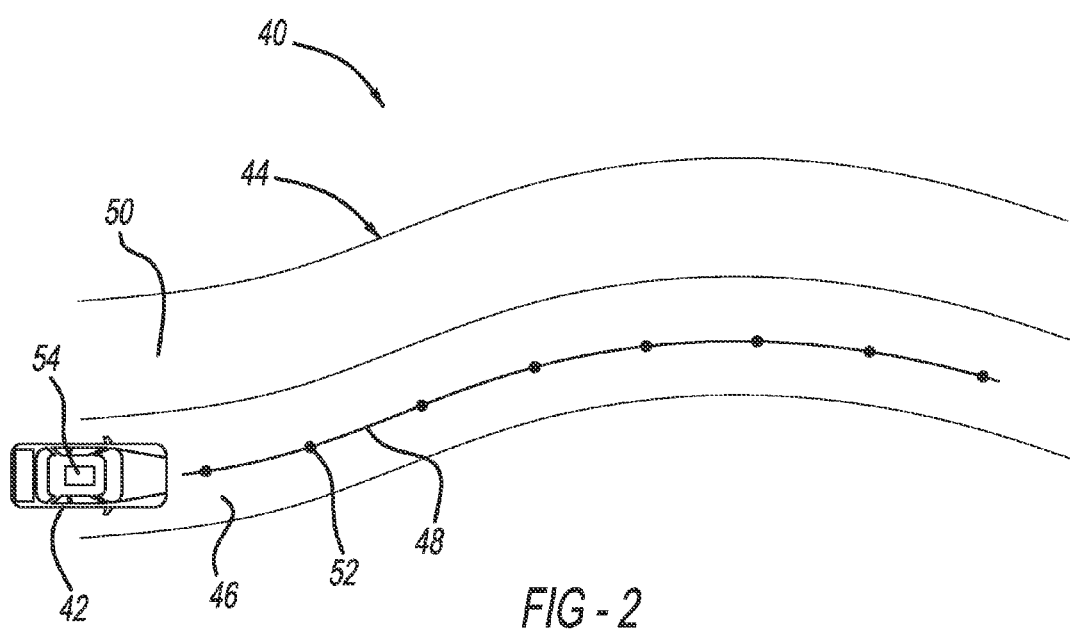
FIG. 2 is an illustration of a vehicle traveling on a roadway showing a calculated vehicle path.

FIG. 2 is an illustration 40 of a vehicle 42 traveling on a lane 46 of a roadway 44 along an estimated lane center line 48 at the center of the lane 46 that has been determined by the lane center estimate algorithm from various sensing measurements, e.g., forward-looking camera and GPS/map database, where the roadway 44 also includes an adjacent lane 50. As above, the vehicle 42 is equipped with all of components necessary for path prediction and generation, represented generally as box 54, including a forward-looking vision camera that detects lane marks on the roadway 44, where a series of points 52 along the lane 46 identify the desired x, y position of the vehicle 40 at the camera sampling times as it travels along the center line 48, and where the points 52 are an average distance between markings at the right and left edge of the lane 46. In FIG. 2 (the ideal case), the lane center line 48 is exactly overlapped with the desired path of the vehicle 42. However, in reality, there would be a discrepancy between the desired path that the vehicle 42 needs to follow and the actual center of the lane 46. One obvious reason for the discrepancy is an obstacle in the lane, so the desired path should be generated to avoid the obstacle. Another reason for the discrepancy is that the initial vehicle position is not in the center of the lane and the moving direction is not perfectly aligned with the lane center line 48.

Determining the lane center line 48 using the camera 14 from the '739 patent is partially recreated below. The camera 14 provides estimates of the position and orientation of the lane 46 with respect to the center of the vehicle 42 by the points 52. In this embodiment, the roadway 44 is modeled as two sections of second order polynomial equations as:

$$y_{sec1}(x) = A_1 x^2 + B_1 x + C_1, \ 0 \le x \le x_1 \quad (1)$$

$$y_{sec2}(x) = A_2 x^2 + B_2 x + C_2, \ x_1 \le x \le x_2 \quad (2)$$

where $x_1$ and $x_2$ represent the end points along the x-axis of the first section and the second section and $y_{sec1}$ and $y_{sec2}$ represent the lateral offset of the roadway 44 with respect to the vehicle coordinate system $R_v(t)$. The measurements provided by the camera 14 include yaw angle $\phi_{r,1}$ of the vehicle 42 with respect to the first section of the roadway 44, lateral offset $y_{r,1}$ of the vehicle's center of gravity from the lane 46, and roadway curvature $\rho_i$ and $\rho_2$ of the first section and the second section.

From the geometric relationship between the roadway 44 and the lane representation, the coefficients of equations (1) and (2) can be related as:

$$A_1 = \frac{\rho_1}{2}, \quad (3)$$

$$A_2 = \frac{\rho_2}{2}, \quad (4)$$

$$B_1 = \tan\varphi_1, \quad (5)$$

$$C_1 = y_{r,1}, \quad (6)$$

It is assumed that the roadway 44 runs without discontinuity, that is, the two sections of each roadway representation connect smoothly without an abrupt change at the transition point $x_1$. Only the zeroth and first order continuity are assumed herein, so equations (7) and (8) below hold at the transition point $x_1$.

$$y_{sec1}(x_1) = y_{sec2}(x_1), \quad (7)$$

$$\left.\frac{dy_{sec1}}{dx}\right|_{x=x1} = \left.\frac{dy_{sec2}}{dx}\right|_{x=x1}. \quad (8)$$

Substituting equations (3)-(8) into equations (1) and (2) provides:

$$C_2 = y_{sec1}(x_1), \quad (9)$$

$$B_1 = 2A_1 x_1 + B_1. \quad (10)$$

By integrating equations (3)-(6), (9) and (10), equations (1) and (2) can be rewritten in terms of the measurements of the camera 14 as:

$$y_{sec1}(x) = \frac{\rho_1}{2}x^2 + \tan(\varphi_1)x + y_{r,1}, \ 0 < x < x_1 \quad (11)$$

$$y_{sec2}(x) = \frac{\rho_2}{2}x^2 + (\rho_1 \cdot x_1 + \tan(\varphi_1))x + y_{sec1}(x_1). \ x_1 < x < x_2 \quad (12)$$

Assuming that the vehicle 42 is operating at a longitudinal speed $v_x$ and there are no obstacles in the roadway 44, then the driver/passengers comfort depends on the vehicle's lateral acceleration $a_y$ and the lateral acceleration $a_y$ is a function of the vehicle speed $v_x$ and the steering angle $\delta$. A time variable $t_{LX}$ is specified to complete a lane change maneuver independent of the vehicle longitudinal speed $v_x$ unless the calculated lateral acceleration $a_y$ is predicted to be over a certain limit during the lane change maneuver. If the lateral acceleration $a_y$ is over the limit, a new path is calculated with a new extended lane change maneuvering time.

The vehicle longitudinal speed $v_x$ is measured by the vehicle speedometer, and the lateral offset, heading angle and roadway curvature $\rho$ are measured by the camera 14. The desired path generation is formulated for the lane change maneuver as a boundary condition problem. Assume that the lane change control begins at $t=0$ and define $(x(t),y(t))$ as the vehicle position at time t with respect to the origin $R_v(0)$ of the coordinate system. Note that the coordinate system $R_v$ is the vehicle coordinate system captured at time $t=0$ and the position and the heading angle of the vehicle 42 at $t=0$ are aligned with $R_v(0)$. Thus, $(x(t=0, y(t=0))=(0,0)$ and $y'(0)=0$ can be set without loss of generality.

The initial and final states $(y,y',y'')_{t=0}$ and $(y,y',y'')_{t=t_{LX}}$ of the vehicle 42 can then be obtained by manipulating the roadway representation equations (11) and (12). The value $(x(t_{LX}), y(t_{LX}))$ corresponds to the desired position of the vehicle 42 at time $t=t_{LX}$, where $x(t_{LX})$ can be estimated by integrating the vehicle longitudinal speed $v_x$ and the value $y(t_{LX})$ can be obtained by the lane width and the roadway geometry. Note that $y_r$ in equations (3)-(6) represents the lateral offset of the roadway from the center of the vehicle 42, and here y represents the vehicle location with respect to $R_v(0)$.

Selecting a fifth-order polynomial equation for the x and y positions of the vehicle 42 gives:

$$y(x) = a_5 x^5 + a_4 x^4 + a_3 x^3 + a_2 x^2 + a_1 x + a_0. \quad (13)$$

Considering the initial and final conditions gives:

$$(y(x), y'(x), y''(x))_{t=0} = (0, 0, y''_{seg1}(x(0))), \quad (14)$$

$$(y(x), y'(x), y''(x))_{t=t_{LX}} = \quad (15)$$

$$\begin{cases} (y_{seg1}(x(t_{LX})), y'_{seg1}(x(t_{LX})), y''_{seg1}(x(t_{LX}))), & \text{if } 0 < x(t_{LX}) < x_1 \\ (y_{seg2}(x(t_{LX})), y'_{seg2}(x(t_{LX})), y''_{seg2}(x(t_{LX}))), & \text{if } x_1 < x(t_{LX}) < x_2 \end{cases}$$

The problem can be solved by the following linear equation:

$$\begin{bmatrix} a_0 \\ a_1 \\ a_2 \\ a_3 \\ a_4 \\ a_5 \end{bmatrix} = \begin{bmatrix} 1 & x(0) & x^2(0) & x^3(0) & x^4(0) & x^5(0) \\ 0 & 1 & 2x(0) & 3x^2(0) & 4x^3(0) & 5x^4(0) \\ 0 & 0 & 2 & 6x(0) & 12x^2(0) & 20x^3(0) \\ 1 & x(t_{LX}) & x^2(t_{LX}) & x^3(t_{LX}) & x^4(t_{LX}) & x^5(t_{LX}) \\ 0 & 1 & 2x(t_{LX}) & 3x^2(t_{LX}) & 4x^3(t_{LX}) & 5x^4(t_{LX}) \\ 0 & 0 & 0 & 6x(t_{LX}) & 12x^2(t_{LX}) & 20x^3(t_{LX}) \end{bmatrix}^{-1} \quad (16)$$

$$\begin{bmatrix} y(x(0)) \\ y'(x(0)) \\ y''(x(0)) \\ y(x(t_{LX})) \\ y'(x(t_{LX})) \\ y''(x(t_{LX})) \end{bmatrix}.$$

The path generation problem can be simplified by normalization of the coordinates. Denoting the normalized coordinates as $(x_n(t), y_n(t))$ gives:

$$x_n(t) = \frac{x(t)}{x(t_{LX})}, \quad (17)$$

$$y_n(x(t)) = \frac{y(x(t))}{y(x(t_{LX}))}. \quad (18)$$

Substituting equations (17) and (18) into equation (13) and redefining the coefficients of the polynomial equation, $y_n$ can be obtained by the following equation:

$$y_n(x_n) = a_{n,5} x_n^5 + a_{n,4} x_n^4 + a_{n,3} x_n^3 + a_{n,2} x_n^2 + a_{n,1} x_n + a_{n,0}. \quad (19)$$

Applying the normalized coordinates of equations (17) and (18) into the initial and final conditions, the normalized coordinates can be rewritten to the conditions as:

$$(y_n(x_n), y'(x_n)_n, y''(x_n)_n)_{t=0} = \left(0, 0, y''_{seg1}(x(0)) \cdot \frac{x^2(t_{LX})}{y(t_{LX})}\right), \quad (20)$$

$$(y_n(x_n), y'(x_n)_n, y''(x_n)_n)_{t=t_{LX}} = \quad (21)$$

$$\begin{cases} \left(1, y'_{seg1}(x(t_{LX})) \cdot \frac{x(t_{LX})}{y(t_{LX})}, y''_{seg1}(x(t_{LX})) \cdot \frac{x^2(t_{LX})}{y(t_{LX})}\right), & \text{if } 0 < x < x_1 \\ \left(1, y'_{seg2}(x(t_{LX})) \cdot \frac{x(t_{LX})}{y(t_{LX})}, y''_{seg2}(x(t_{LX})) \cdot \frac{x^2(t_{LX})}{y(t_{LX})}\right), & \text{if } x_1 < x < x_2 \end{cases}.$$

The linear equation problem of equation (16) can then be simplified as:

$$\begin{bmatrix} a_{n,0} \\ a_{n,1} \\ a_{n,2} \\ a_{n,3} \\ a_{n,4} \\ a_{n,5} \end{bmatrix} = \begin{bmatrix} 1 & 0 & 0 & 0 & 0 & 0 \\ 0 & 1 & 0 & 0 & 0 & 0 \\ 0 & 0 & 2 & 0 & 0 & 0 \\ 1 & 1 & 1 & 1 & 1 & 1 \\ 0 & 1 & 2 & 3 & 4 & 5 \\ 0 & 0 & 2 & 6 & 12 & 20 \end{bmatrix}^{-1} \begin{bmatrix} y_n(0) \\ y'_n(0) \\ y''_n(0) \\ y_n(1) \\ y'_n(1) \\ y''_n(1) \end{bmatrix}. \quad (22)$$

Note that the roadway conditions are captured only by the y-vector and the matrix is a constant matrix regardless of the initial condition, the final condition or the road geometry. Therefore, the solution of equation (22) can be obtained by a few simple algebraic computations. Once the solution is calculated, equation (19) represents the desired path to complete the current lane change maneuver in normalized coordinates. Applying equation (18) can yield the desired path profile in the vehicle coordinates.

Recall the initial position of the vehicle (x(t=0),y(t=0)=(0, 0) and the initial heading angle y'0=0 because the vehicle motion is described by the vehicle coordinate system captured at t=0, $R_v(0)$. In curved roadway cases, the boundary conditions can be written as:

$$(y(x(0))y'(x(0))y''(x(0)))=(0 \; 0y'_{seg}(0)), \quad (23)$$

$$(y(x(t_{LX}))y'(x(t_{LX}))y''(x(t_{LX})))=(y_{seg}(x(t_{LX}))+y'_{seg}(x(t_{LX}))y''_{seg}(x(t_{LX}))), \quad (24)$$

where L is the lane width and $x(t_{LX})$ is the x-coordinate at time $t_{LX}$ that corresponds to the longitudinal distance of travel to complete the lane change maneuver. The value $x(t_{LX})$ can be estimated by integrating the vehicle speed $v_x$ over time. Note that $y_{seg}$ can be either $y_{seg1}$ or $y_{seg2}$ depending on which segment $x(t_{LX})$ belongs to, i.e.:

$$y_{seg} = \begin{cases} y_{seg1}(x(t_{LX})), & \text{if } 0 < x(t_{LX}) < x_1 \\ y_{seg2}(x(t_{LX})), & \text{if } x_1 < x(t_{LX}) < x_2 \end{cases}. \quad (25)$$

In normalized form, the initial and final conditions are:

$$(y_n(x_n=0) \; y'_n(x_n=0) \; y''_n(x_n=0)) = \left( 0 \; 0 \; y''_{seg}(0) \cdot \frac{x^2(t_{LX})}{y(x(t_{LX}))} \right), \quad (26)$$

$$(y_n(x_n=1) \; y'_n(x_n=1) \; y''_n(x_n=1)) = \left( 1 \; y'_{seg}(x(t_{LX})) \cdot \frac{x(t_{LX})}{y(x(t_{LX}))} \; y''_{seg}(x(t_{LX})) \cdot \frac{x^2(t_{LX})}{y(x(t_{LX}))} \right). \quad (27)$$

Substituting equations (26) and (27) into the linear equation (22) results in the following solution:

$$a_{n,0} = a_{n,1} = 0, \quad (28)$$

$$a_{n,2} = 0.5 y''_{seg1} \cdot \frac{x^2(t_{Lx})}{y(x(t_{Lx}))}, \quad (29)$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) - 0.5 y''_{seg}(0) \cdot \frac{x^2(t_{Lx})}{y(x(t_{Lx}))} \\ y'_n(1) - 0.5 y''_{seg}(0) \cdot \frac{x^2(t_{Lx})}{y(x(t_{Lx}))} \\ y''_n(1) - 0.5 y''_{seg}(0) \cdot \frac{x^2(t_{Lx})}{y(x(t_{Lx}))} \end{bmatrix}. \quad (30)$$

Note that $y_{seg}$ can be either $y_{seg1}$ or $y_{seg2}$ depending on which segment $x(t_{LX})$ belongs to.

As seen in equation (30), the first two coefficients of the polynomial equation are always zero. Further the rest of the coefficients can be calculated with a few algebraic computations with the boundary conditions.

For straight road cases, the path generation problem can be further simplified. The road curvature ρ is zero throughout the lane change maneuver and the desired heading angle at the end of the lane change will be also zero. Thus, initial and final conditions are:

$$(y(x(0))y'(x(0))y''(x(0)))=(0 \; 0 \; 0), \quad (31)$$

$$(y(x(t_{LX}))y'(x(t_{LX}))y''(x(t_{LX})))=(L \; 0 \; 0), \quad (32)$$

where L is the lane width.

In normalized form, the initial and final conditions can be written as:

$$(y_n(x_n=0)y'_n(x_n=0)y''_n(x_n=0))=(0 \; 0 \; 0), \quad (33)$$

$$(y_n(x_n=1)y'_n(x_n=1)y''_n(x_n=1))=(1 \; 0 \; 0). \quad (34)$$

Finally, substituting the conditions of equations (33) and (34) in the linear equation leads to the following solution:

$$a_{n,0} = a_{n,1} = a_{n,2} = 0, \quad (35)$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) \\ y'_n(1) \\ y''_n(1) \end{bmatrix} = \begin{bmatrix} 10 \\ -15 \\ 6 \end{bmatrix}. \quad (36)$$

As seen in equation (36), the coefficients of the polynomial equation for the straight road are constant regardless of the lane change maneuver distance, that is, the desired path is predetermined and no online computation is needed for the lane change maneuver for straight road circumstances.

The discussion above provides the calculations and operations that are employed to model the vehicle path as a fifth-order polynomial equation for the vehicle 42 to follow based on the position of the roadway 44 as defined by measurements from the camera 14 and as set forth in the '739 patent. However, as mentioned above, the camera 14 has a limited effective distance, which may not be far enough to perform a lane change maneuver at higher vehicle speeds. As will be discussed in detail below, the present invention proposes separating the roadway 44 into segments based on how well the roadway 44 can be defined.

Figure 3:
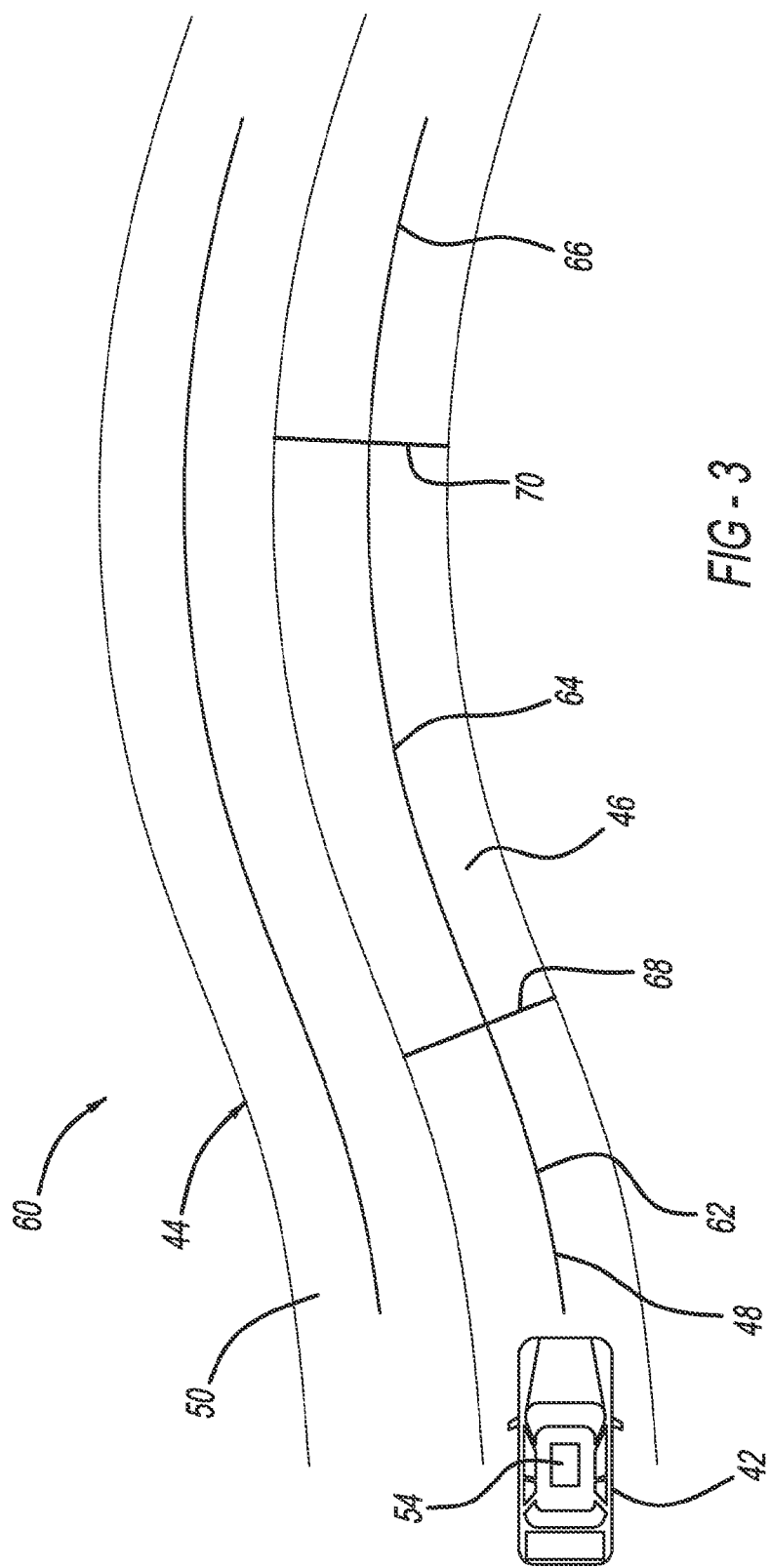
FIG. 3 is an illustration of a vehicle traveling on a roadway and showing a calculated vehicle path for different segments, where the path is determined by camera measurements and a map database.

FIG. 3 is an illustration 60 of the roadway 44, where like elements are identified by the same reference number, and showing the center line 48 being separated into three segments, namely, a first segment 62, a second segment 64 and a third segment 66, where a transition line 68 separates the first segment 62 and the second segment 64 and a transition line 70 separates the second segment 64 and the third segment 66. For the equations discussed below, the first segment 62 will be represented as seg1, the second segment 64 will be represented as seg2 and the third segment 66 will be represented as seg3. Although this example only discusses three segments, the number of segments required will depend on a number of factors, including the speed of the vehicle 42 and the curvature of the roadway 44, as will be discussed in further detail below.

The first segment 62 is immediately in front of the vehicle 42 and the center line 48 is determined in the first segment by the camera measurements as discussed above and in the '739 patent. More particularly, the camera 14 provides measurement values $c_0$, $c_1$, $c_2$ and $c_3$ and the algorithm determines the coefficients $a_0$, $a_1$, $a_2$, $a_3$, $a_4$ and $a_5$ for the fifth-order polynomial equation defining the center line 48 for the vehicle 42 to follow. For the discussion below, the first segment 62 is defined by the camera measurements and a single third-order polynomial equation as:

$$y_{seg1}(x) = c_{3,seg1} \cdot x^3 + c_{2,seg1} \cdot x^2 + c_{1,seg1} \cdot x + c_{0,seg1}. \quad (37)$$

Once the center line 48 extends beyond the effective distance of the camera 14, the present invention ends the first segment 62 and smoothly transitions into the second segment 64, where the center line 48 beyond the camera detection range is determined by the map database 20. The algorithm can separate the center line 48 into more than three segments depending on how effective the map database 20 generation of the center line 48 is and the degree of curvature of the roadway 44 and the vehicle moving speed.

As the center line 48 is being calculated for the vehicle 42 at each time step, the algorithm also determines where the transition line 68 between the first segment 62 and the second segment 64 occurs based on the current position of the vehicle 42, camera detection range, and, based on the curvature of the roadway 44, how many additional segments are required at the current vehicle speed to properly provide path planning for various conditions, such as requested lane changes, evasive maneuvers, etc.

As the range of the first segment 62 increases, the difference between the averaged sample points $x_1$, $y_1$ and the $y_{seg1}$ polynomial representation of the lane center line 48 increases creating an error that defines the effective range of the camera 14. The present invention proposes determining when that error exceeds a certain cost function J to determine the end of the first segment 62 at the transition line 68. At each time step, the values $c_{0,seg1}$, $c_{1,seg1}$, $c_{2,seg1}$ and $c_{3,seg1}$ are calculated by a least squares method with the cost function J defined as:

$$J = \frac{1}{2}\Sigma_1[(y_i(x=x_i) - y_{seg1}(x=x_i))^2]. \quad (38)$$

From the least squares method, the solution of the coefficients $c_{0,seg1}$, $c_{1,seg1}$, $c_{2,seg1}$ and $c_{3,seg1}$ are determined as:

$$\begin{bmatrix} c_{3,seg1} \\ c_{2,seg1} \\ c_{1,seg1} \\ c_{0,seg1} \end{bmatrix} = \begin{bmatrix} x_1^3 & x_1^2 & x_1 & 1 \\ \cdots & \cdots & \cdots & 1 \\ x_n^3 & x_n^n & x_n & 1 \end{bmatrix}^{-1} \cdot \begin{bmatrix} y_1 \\ y_2 \\ \cdots \\ y_n \end{bmatrix}. \quad (39)$$

If the cost function J at a particular sample point $x_i$ exceeds a certain threshold $J_{threshold}$, the algorithm ends the first segment 62 at that $x_i$ sample point and sets the value $x_{cam\_range} = x_i$. This cost function analysis is performed at every sample time so that the sample point $x_i$ representing the end of the first segment 62 is continually updated.

At the transition line 68 between the first segment 62 and the second segment, the center line 48 will then start being calculated by the map database 20 that is fused to the previously calculated center line 48 in the first segment 62 based on the camera measurement points c. The center line 48 for the second segment 64 is defined by a third order polynomial as:

$$y_{seg2}(x) = c_{3,seg2} \cdot x_{seg2}^3 + c_{2,seg2} \cdot x_{seg2}^2 + c_{0,seg2},$$

$$x_{seg1\_range} \leq x < x_{seg2\_range} \quad (40)$$

where $x_{seg2} \equiv x - x_{seg1\_range}$ and the values $c_{3,seg2}$ and $c_{2,seg2}$ are measurements available from the map database 20.

In order to make the transition from the first segment path to the second segment path smooth, the values $c_{1,seg2}$ and $c_{0,seg2}$ are calculated from the first segment 62 by applying two continuity constraints. The first constraint includes the first point of the center line 48 for the second segment 64 is the same as the last point of the center line 48 for the first segment 62 as:

$$y_{seg1}(x = x_{seg1\_range}) = y_{seg2}(x = x_{seg1\_range}). \quad (41)$$

The second constraint includes making the slope of the path line for the first segment 62 the same as the slope of the path line for the second segment 64 at the transition line 68 as:

$$y'_{seg1}(x = x_{seg1\_range}) = y'_{seg2}(x = x_{seg1\_range}), \quad (42)$$

where $y' \equiv d_y/d_x$.

The transition line 70 between the second segment 64 and the third segment 66 is determined based on the curvature of the roadway 44 so that the center line 48 follows a smooth transition in the center of the lane 46. If the map database 20 determines that the roadway curvature changes more than a certain threshold, such as 1/10,000 (1/m), from the start point of the second segment 64 to an end point of the second segment 64, the third segment 66 is started and is defined as:

$$y_{seg3}(x) = c_{3,seg3} \cdot x_{seg3}^3 + c_{2,seg3} \cdot x_{seg3}^2 + c_{1,seg3} \cdot x_{seg3} + c_{0,seg3}, \quad (43)$$

where $x_{seg3} \equiv x - x_{seg2\_range}$, and the values $c_{3,seg3}$ and $c_{2,seg3}$ are obtained directly from the map database 20.

The transition line 70 from the second segment 64 to the third segment 66 is also subject to the continuity constraints discussed above. Thus, the values $c_{1,seg3}$ and $c_{0,seg3}$ are calculated from these continuity constraints.

$$y_{seg2}(x = x_{seg2\_range}) = y_{seg3}(x = x_{seg2\_range}), \quad (44)$$

$$y'_{seg2}(x = x_{seg2\_range}) = y'_{seg3}(x = x_{seg2\_range}). \quad (45)$$

Some map databases only provide road curvature $\rho(x)$ at the points $x_i$, and do not provide the values $c_{3,seg2}$, $c_{2,seg2}$, $c_{3,seg3}$ and $c_{2,seg3}$. For those map databases, the transition line 70 can be determined in the same manner as the transition line 68 between the first segment 62 and the second segment 64. Particularly, if the map database 20 only provides road curvature $\rho$, then the values $c_{2,seg2}$ and $c_{3,seg2}$ can be directly calculated from the roadway points available in the map database 20, as described above. For this embodiment, the cost function J is again defined as:

$$J = \frac{1}{2}\Sigma_1[(y_i(x=x_i) - y_{seg2}(x=x_1))^2], \quad (46)$$

where $y_{seg2}(x) = c_{3,seg2} \cdot x_{seg2}^3 + c_{2,seg2} \cdot x_{seg2}^2 + c_{1,seg2} \cdot x_{seg2} + c_{0,seg2}$, and the least square method is used to find the values $c_{3,seg2}$ and $c_{2,seg2}$.

The solution after the least square method are calculated as:

$$\begin{bmatrix} c_{3,seg2} \\ c_{2,seg2} \end{bmatrix} = \begin{bmatrix} x_1^3 & x_1^2 \\ \cdots & \cdots \\ x_n^3 & x_n^2 \end{bmatrix}^{-1} \cdot \begin{bmatrix} y_1 - c_{1,seg2} \cdot x_1 - c_{0,seg2} \\ y_2 - c_{1,seg2} \cdot x_2 - c_{0,seg2} \\ \cdots \\ y_n - c_{1,seg2} \cdot x_n - c_{0,seg2} \end{bmatrix}, \quad (47)$$

where the values $c_{3,seg3}$, and $c_{2,seg3}$ can be obtained in the same manner.

Figure 4:
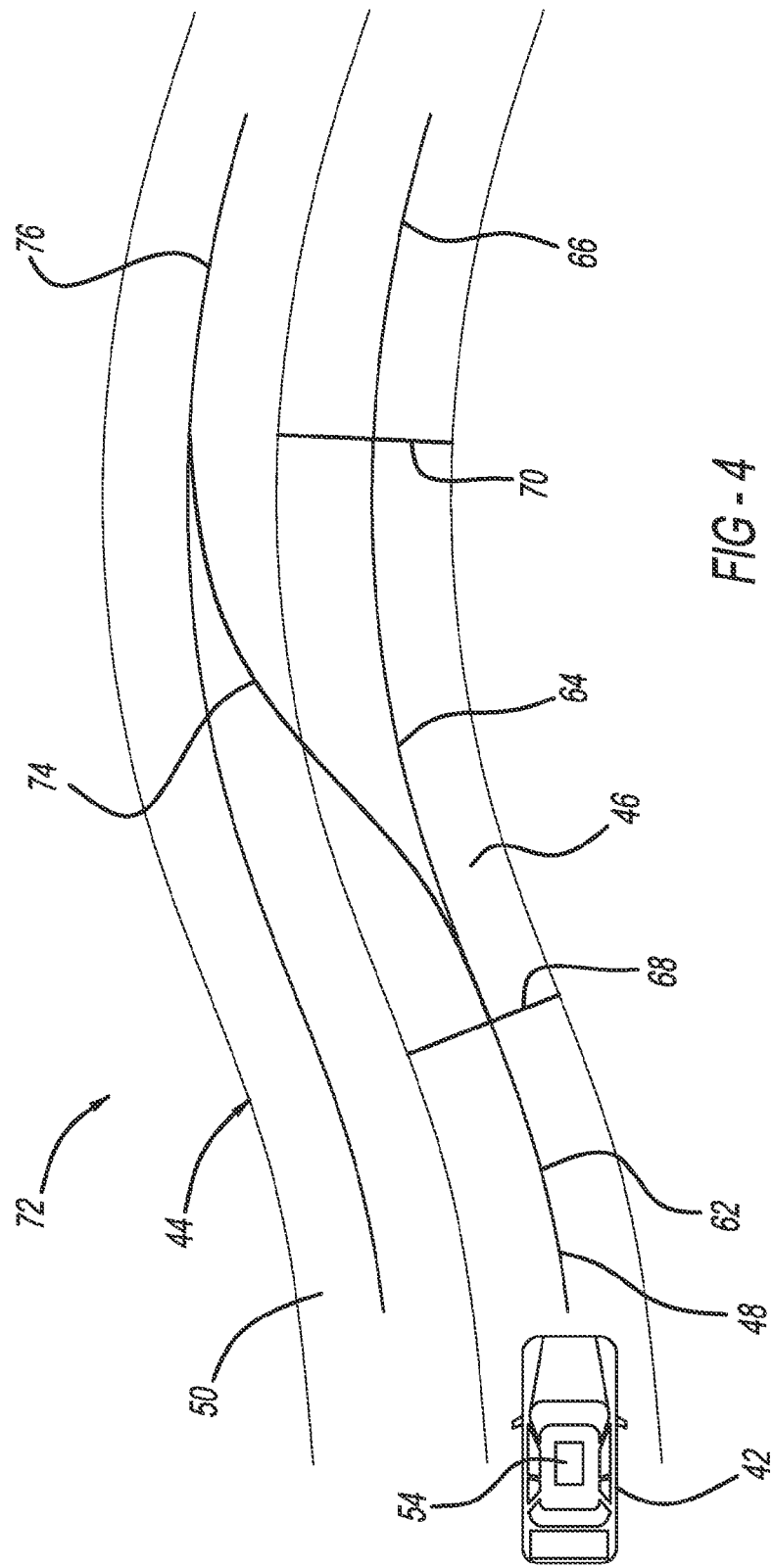
FIG. 4 is an illustration of a vehicle traveling on a roadway and showing a lane change path.

If the vehicle 42 is traveling along the center line 48 and a lane change is commanded, that lane change is performed in the same manner as in the '789 patent. FIG. 4 is an illustration 72 of the roadway 44 similar to the illustration 60, where like elements are identified by the same reference number, and showing a lane change path 74 that is determined by the algorithm so that the vehicle 42 leaves the center line 48 in the lane 46 and travels into the adjacent lane 50, where it will then be centered in the lane 50 on lane path 76. According to the invention, the algorithm first determines how many segments are needed to complete the requested lane change maneuver, i.e., how far beyond the range of the camera 14 the lane change will be completed from the vehicle's current position. For example, depending on the speed of the vehicle 42, the curvature of the roadway 44, steering aggressiveness profiles, etc., the algorithm will determine how much time is required to make the lane change request, and how far from the current vehicle's position the lane change will be completed. To accomplish this, a lane change time $\Delta T$, such as six seconds, is given and the value $v_x \Delta T$ is compared with the values $x_{seg1\_range}$, $x_{seg2\_range}$, $x_{seg3\_range}$, etc., to find which segment the value $v_x \Delta T$ belongs in. For example, assume that:

$$x_{seg2\_range} < v_x \Delta T < x_{seg3\_range}. \quad (48)$$

Based on this assumption, the analysis for the lane path change includes using the first segment lane representation for the initial condition to change the lane and the third segment lane representation for the ending condition of the lane path 76 in the adjacent lane 50. For the initial condition, the path starts from the current vehicle position y(0)=0, the current vehicle heading direction y'(0)=0, and the curvature of the current vehicle path $y''(0)=2c_{2,seg1}$. The terminal conditions for when the lane change has been completed at the center of the adjacent lane 50 is aligned with the lane in the first order and second order derivatives as:

$$y(x_1) = c_{3,seg3} \cdot x_1^3 + c_{2,seg3} \cdot x_1^2 + c_{1,seg3} \cdot x_1 + c_{0,seg3} L, \quad (49)$$

$$y'(x_1) = c_{3,seg3} \cdot x_1^2 + c_{2,seg3} \cdot x_1 + c_{1,seg3}, \quad (50)$$

$$y''(x_1) = 6c_{3,seg3} \cdot x_1 + 2c_{2,seg3}. \quad (51)$$

The algorithm starts from the fifth-order normalized path equation:

$$y_n(x_n) = a_0 + a_1 x_n + a_2 x_n^2 + a_3 x_n^3 + a_4 x_n^4 + a_5 x_n^5, \quad (52)$$

$$0 \le x_n = \frac{x}{v_x \Delta T} \le 1, \quad (53)$$

$$y_n = \frac{y}{L}, \quad (54)$$

where the coefficients $a_0, a_1, a_2, a_3, a_4$, and $a_5$ are unknowns and the values $v_x$, $\Delta T$ and $L$ are knowns.

Applying the initial/terminal conditions, the algorithm determines the coefficients $a_0, a_1, a_2, a_3, a_4$, and $a_5$ as:

$$a_0 = 0, \quad (55)$$
$$a_1 = 0,$$
$$a_2 = c_{2,seg1} \cdot \frac{(v_x \cdot \Delta T)^2}{L},$$

$$\begin{bmatrix} a_3 \\ a_4 \\ a_5 \end{bmatrix} = \frac{1}{L} \begin{bmatrix} 10 & 6 & 0 & 1 \\ -15 & -8 & 0 & 0 \\ 6 & 3 & 0 & 0 \end{bmatrix} \cdot \begin{bmatrix} c_{0,seg3} \\ c_{1,seg3} \cdot v_x \cdot \Delta T \\ c_{2,seg3} \cdot (v_x \cdot \Delta T)^2 \\ c_{3,seg3} \cdot (v_x \cdot \Delta T)^3 \end{bmatrix} \cdot \begin{bmatrix} 1 \\ 0 \\ 0 \end{bmatrix}. \quad (56)$$

The fifth-order polynomial equation (51) with the determined coefficients $a_0, a_1, a_2, a_3, a_4$, and $a_5$ is the final solution for the lane change desired path. Note that the values $c_{2,seg1}$, $c_{0,seg3}$, $c_{1,seg3}$, $c_{2,seg3}$, and $c_{3,seg3}$ are the lane center parameters determined above.

Figure 5:
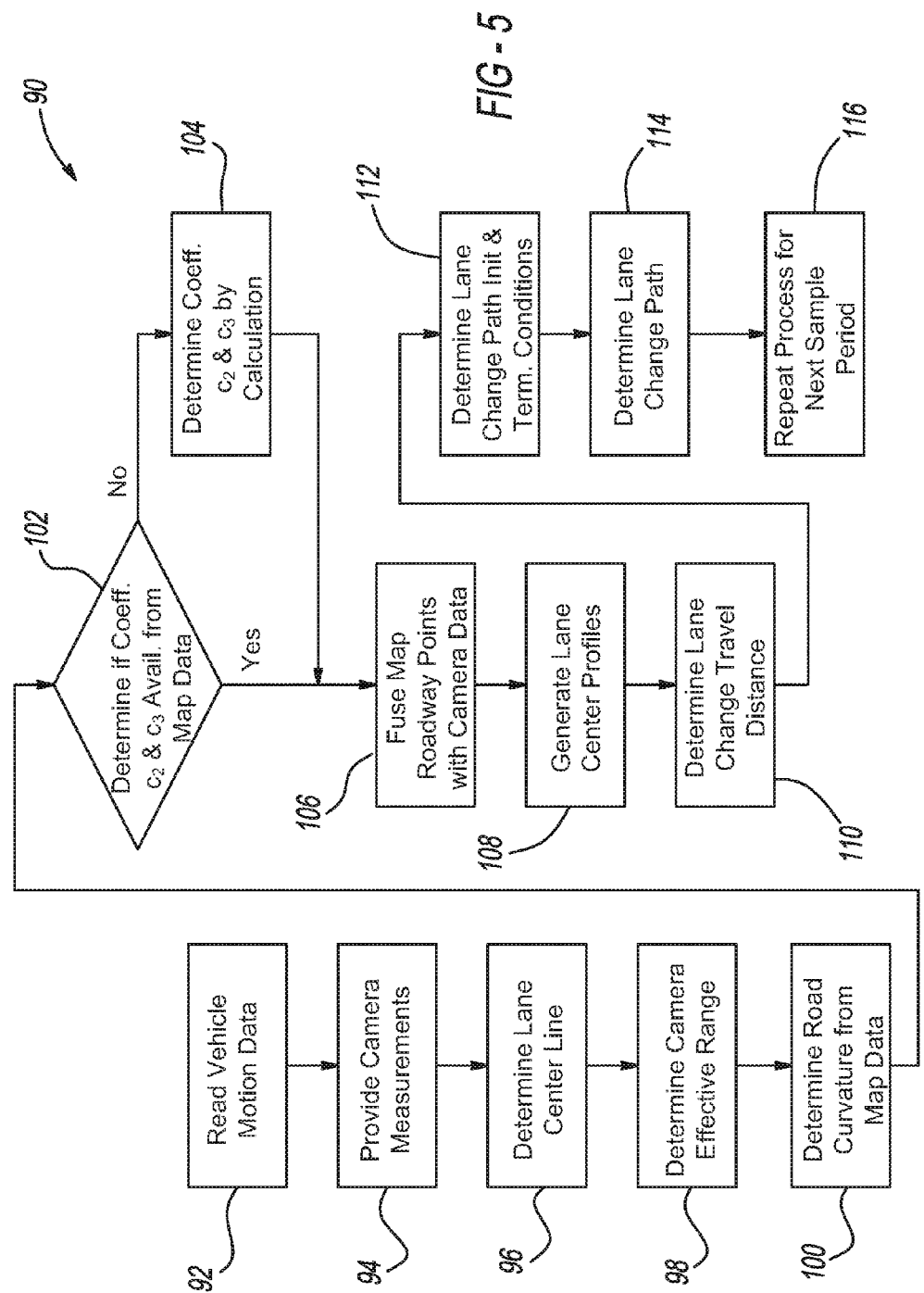
FIG. 5 is a flow chart diagram showing a process for determining a vehicle path.

FIG. 5 is a flow chart diagram 90 showing a process for determining the lane center and lane path planning as discussed above. The algorithm starts at box 92 by reading vehicle motion data, such as vehicle speed, yaw-rate, etc., and then provides camera measurements at box 94 for lane determination. The algorithm then determines the lane center line from the camera measurements at box 96 and determines the effective range of the camera 14 at box 98, which is the transition from the first segment 62 to the second segment 64. The algorithm then reads map data from the map database 20 to determine road curvature at box 100 and does a map attribute check to determine if the values $c_2$ and $c_3$ are available from the map database 20 at decision diamond 102. If the values $c_2$ and $c_3$ are not available at the decision diamond 102, then the algorithm determines the values $c_2$ and $c_3$ at box 104 as discussed above for equation (45). Once the values $c_2$ and $c_3$ are either available from the map database 20 at the decision diamond 102 or are determined at the box 104, the algorithm provides map fusion of the map roadway points and the camera measurements for transition into the second segment 62 at box 106. The algorithm then generates multi-segment lane center profiles for the second segment 64 into the third segment 66 and beyond at box 108. If a lane change is requested, the algorithm determines the lane change travel distance at box 110, and then the initial and terminal conditions for the lane change path at box 112. The algorithm then makes the determination of the lane change path at box 114, and repeats the process for the next sample period at box 116.

The path planning algorithm discussed above first uses camera measurements to determine path planning for the vehicle 42 and then uses map database roadway points as the inputs to determine the path beyond the effective range of the camera 14. In an alternate embodiment, discussed below, the path planning algorithm initially uses the roadway points available from the map database 20 to determine the desired vehicle reference path. For this embodiment, the one path planning algorithm can be used for all of the necessary vehicle path planning maneuvers including a lane change maneuver, static object avoidance, slow down for moving object in front of the vehicle and an evasive maneuver around an object.

Figure 6:
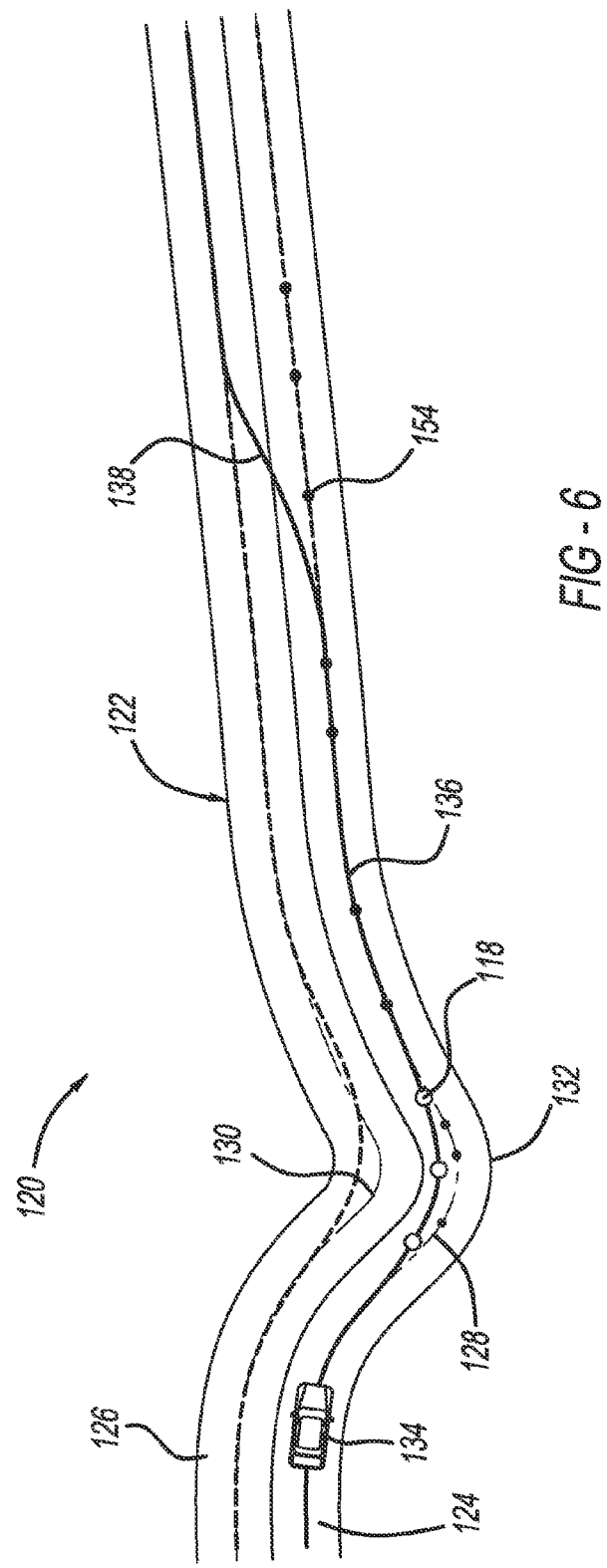
FIG. 6 is an illustration of a vehicle traveling along a roadway showing a calculated path using map database roadway points.

FIG. 6 is an illustration 120 of a roadway 122 including two adjacent lanes 124 and 126 each including a lane center line 128 and 130, respectively, where a relatively sharp turn 132 is in the roadway 122. A vehicle 134 is traveling in the lane 124, where a path planning and generation algorithm causes the vehicle 134 to be automatically steered at the proper speed along a reference path 136, and where the path 136 may or may not exactly follow the center line 128. During the path planning and generation process, different situations may cause the vehicle 134 to adjust the path 136 and/or adjust its speed. For example, the path planning and generation algorithm may receive a request for a lane change from the lane 124 to the lane 126 for any number of reasons, where the path planning and generation algorithm will cause the vehicle 134 to leave the path 136 and the lane 124 and travel into the lane 126 along a lane changing path 138. Also, a static object may be in or partially in the roadway 122 requiring the vehicle 134 to adjust its path to safely go around the object. Further, a slow moving object, such as a bicycle, may be in front of the vehicle 134, which may require the vehicle 134 to slow down to allow the object to move out of the way. Additionally, a pedestrian may be crossing the roadway 122, requiring the vehicle 134 to take an evasive path planning maneuver. The vehicle 134 may make other path changes to follow the roadway 122 in combination with other objects that may be sharing the roadway 122.

Figure 7:
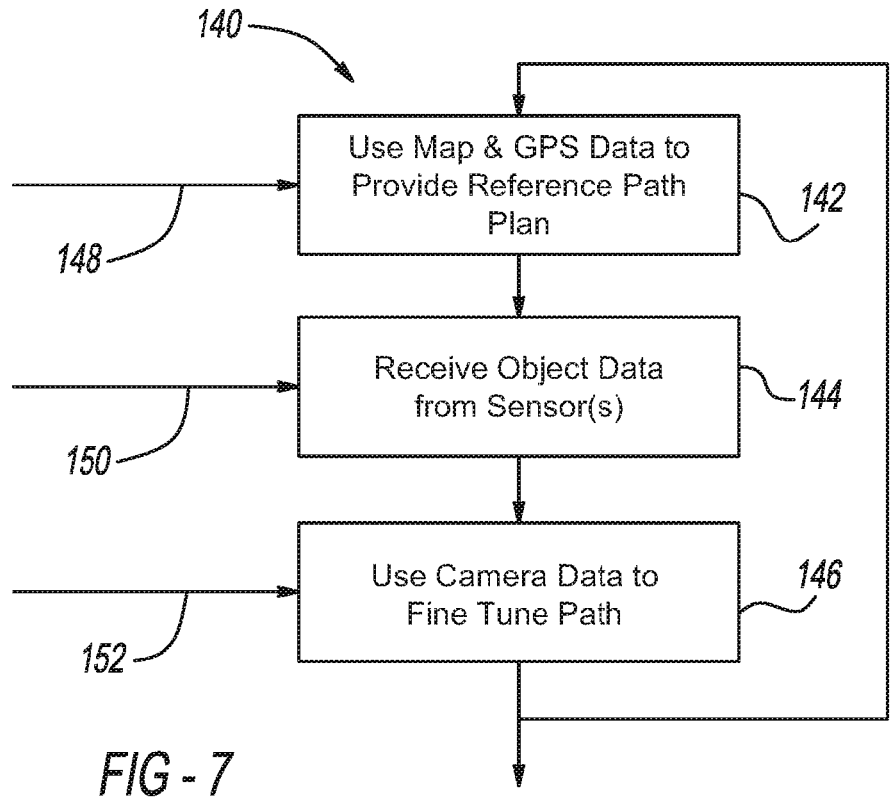
FIG. 7 is a general flow chart diagram showing a general overview of a process for path planning.

FIG. 7 is a block diagram of a system 140 showing a general overview of the path planning and generation process that will be discussed in detail below for the above mentioned situations. At box 142, the algorithm uses map and GPS data provided on line 148 to provide a course reference path plan that does not require consideration for traffic or other obstacles. At box 144, the algorithm receives object data on line 150 from any available sensor on the vehicle 134 indicating some object may interfere with the traffic free reference path where the path needs to be adjusted. At box 146, the algorithm employs camera data provided on line 152 to perform fine tuning of the path for the different traffic situations.

At the box 142, the algorithm receives the map database roadway points and generates a smooth reference path, specifically the path 136, to minimize sharp turning of the vehicle 134, where the algorithm compensates for map inaccuracies. The map database roadway points are shown as a series of points 154 along the lane 124, where the points 154 are not equally spaced apart and provide a course location of the center line 128 of the lane 124. The algorithm spaces the points 154 an equal distance apart so as to provide a better representation of the center of the lane 124. In other words, once the algorithm identifies the roadway points 154 from the map database 20, it identifies the center of the lane 124 from those points, and then moves the points 154 along that line to be an equal distance apart.

The algorithm then smoothes out the reference path of the vehicle 134 through, for example, the curve 132 by reducing the sharp turning requirements of the vehicle 134. More specifically, once the algorithm has the roadway points 154 that roughly identify the center of the lane 124 from which the center line 128 can be determined, the algorithm calculates the reference path 136 that the vehicle 134 will follow based on the curvature of the center line 128 to reduce the aggressive turning requirements of the vehicle 134 for a smoother ride. For example, the roadway points 154 in the curve 132 on the line 128 are moved closer to the inside of the curve 132 as points 118 on the path 136 so as to reduce the amount of turning of the vehicle 134. This is shown as the difference between the center line 128 and the reference path 136 in the lane 124.

Figure 8:
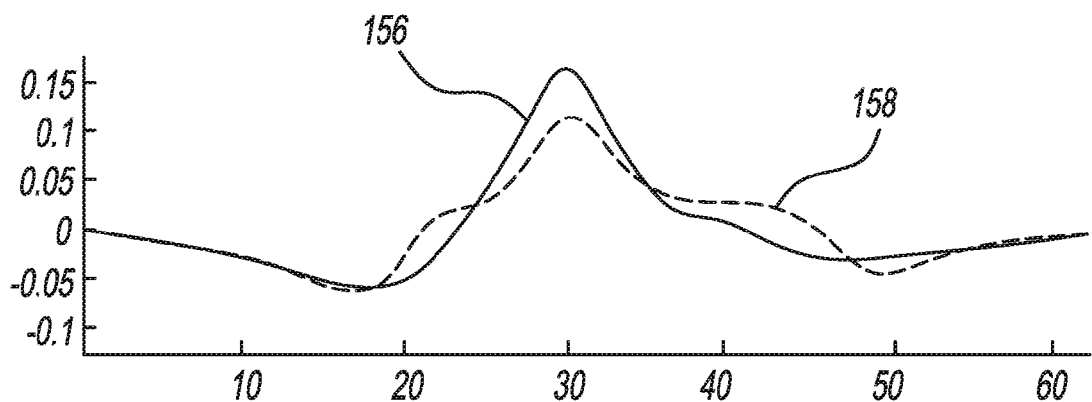
FIG. 8 is a graph with distance on the horizontal axis and roadway curvature on the vertical axis including graph lines showing path curvature.

FIG. 8 is a graph with distance on the horizontal axis and road curvature on the vertical axis including a graph line 156 identifying the amount of curvature of the center line 128 calculated from the points 154 and a graph line 158 showing the curvature of the smooth path along the path 136 of the vehicle 134 after the algorithm has processed the curvature of the center line 128. At high roadway curvature locations, the algorithm selects three adjacent points 118, represented by $p_{i-1}$, $p_i$ and $p_{i+1}$, where i is time. In order to generate the smooth reference path that has the low curvature profile 158, the algorithm minimizes a cost function as:

$$\underset{P \in P}{\operatorname{argmin}} \omega_{smooth} \cdot \Sigma_{pi \in P} \frac{p_i - p_{i-1}}{|p_i - p_{i-1}|} \cdot \frac{p_i - p_{i+1}}{|p_i - p_{i+1}|} + \qquad (57)$$
$$\omega_{length} \cdot \Sigma_{pi \in P} |p_i - p_{i-1}|,$$

where $p_i$ is the ith sample point and $\omega_{smooth}$ is the weight for the path smoothness term:

$$\Sigma_{p_i \in P} \frac{p_i - p_{i-1}}{|p_i - p_{i-1}|} \cdot \frac{p_i - p_{i+1}}{|p_i - p_{i+1}|}, \qquad (58)$$

and where $\omega_{length}$ is the weight for the path length term:

$$\Sigma_{p_i \in P} |p_i - p_{i-1}|. \qquad (59)$$

Through this process, the location of the points 154 at a particular area of high curvature are moved some predetermined amount, for example, 10 cm, laterally for each calculation of the cost function and once the cost function is at its lowest value, those points 118 are selected for the path of the vehicle 134.

Figure 9:
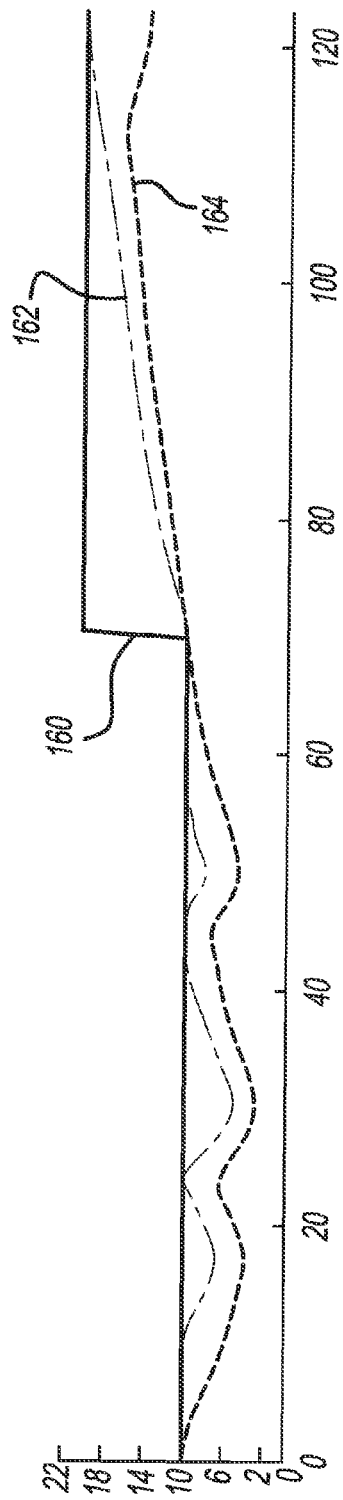
FIG. 9 is a graph with distance on the horizontal axis and vehicle speed on the vertical axis including graph lines showing a posted speed, an extreme speed profile and a comfortable speed profile.

Also at the box 142, the algorithm determines the speed of the vehicle 134 at each location along the generated path 136. FIG. 9 is a graph with distance on the horizontal axis and vehicle speed on the vertical axis including a graph line 160 for the posted speed along the roadway 122 provided by the map database 20. In this embodiment, and with no obstacles in front of the vehicle 134, two speed profiles are identified based on the posted speed, where one of the speed profiles is referred to as an extreme speed profile, represented by graph line 162, where the vehicle 134 may make sudden and abrupt changes in speed. The other speed profile is referred to as a comfort speed profile, represented by graph line 164, and provides less abrupt changes in the vehicle speed for a more comfortable ride. Both of these profiles do not exceed the lateral and longitudinal acceleration limits of the vehicle 134 and the curvature of the roadway 122.

For each roadway point $x_i$, $y_i$, the map database 20 gives a roadway curvature value $\kappa_i$, and roadway speed limit value $V^{speed-limit}$ for the graph line 160. For each point, ($x_i$, $y_i$, $\kappa_i$, $v_i$) the desired vehicle speed $v_i$ is determined as:

$$v_i = \min\left(V^{speed-limit}, \sqrt{\frac{a_y^{limit}}{\kappa_i}}\right), \qquad (60)$$

where if:

$$(v_{i+1}^2)/(2 \cdot s_i) \geq a_{x+}^{limit}, \qquad (61)$$

then:

$$v_{i+1} = \sqrt{v_i^2 + 2 \cdot s_i \cdot a_{x+}^{limit}}, \qquad (62)$$

and if:

$$(v_i^2 - v_{i+1}^2)/(2 \cdot s_i) \geq a_{x-}^{limit}, \qquad (63)$$

then:

$$v_i = \sqrt{v_{i+1}^2 + 2 \cdot s_i \cdot a_{x-}^{limit}}, \qquad (64)$$

and where $s_i$ is the distance between adjacent points, and $a_y^{limit}$, $a_{x+}^{limit}$ and $a_{x-}^{limit}$ are vehicle lateral and longitudinal acceleration limits selected for either the extreme speed profile or the comfort speed profile that are design parameters for tuning. Here, it is assumed that $a_y^{limit}$, $a_{x+}^{limit}$ and $a_{x-}^{limit}$ are given.

Once the desired reference path is generated as discussed above at the box 142, there may be a request for a lane change into the adjacent lane 126 at the box 144, where the path is modified for the lane change at a transition from the current path 128 in the current lane 124 to the desired path 130 in the adjacent lane 126 along the lane change path 138. The lane change path 138 is provided by a separate algorithm, such as discussed above, and the path 138 is fused to the current path for the lane change, where the lane change path model is given as:

$$x(s) = \int_0^{s_f} \cos(\theta(s)) \cdot ds, \quad (65)$$

$$y(s) = \int_0^{s_f} \sin(\theta(s)) \cdot ds, \quad (66)$$

$$\theta(s) = \int_0^{s_f} \kappa(s) \cdot ds, \quad (67)$$

$$\kappa(s) = p_0 + p_1 \cdot s + p_2 \cdot s^2 + \ldots, \quad (68)$$

where s is the arc length variable, x,y are the coordinates in the inertial frame, $\theta$ is the heading angle of the vehicle 134 in the inertial frame, and $\kappa$ is the roadway curvature.

Figure 10:
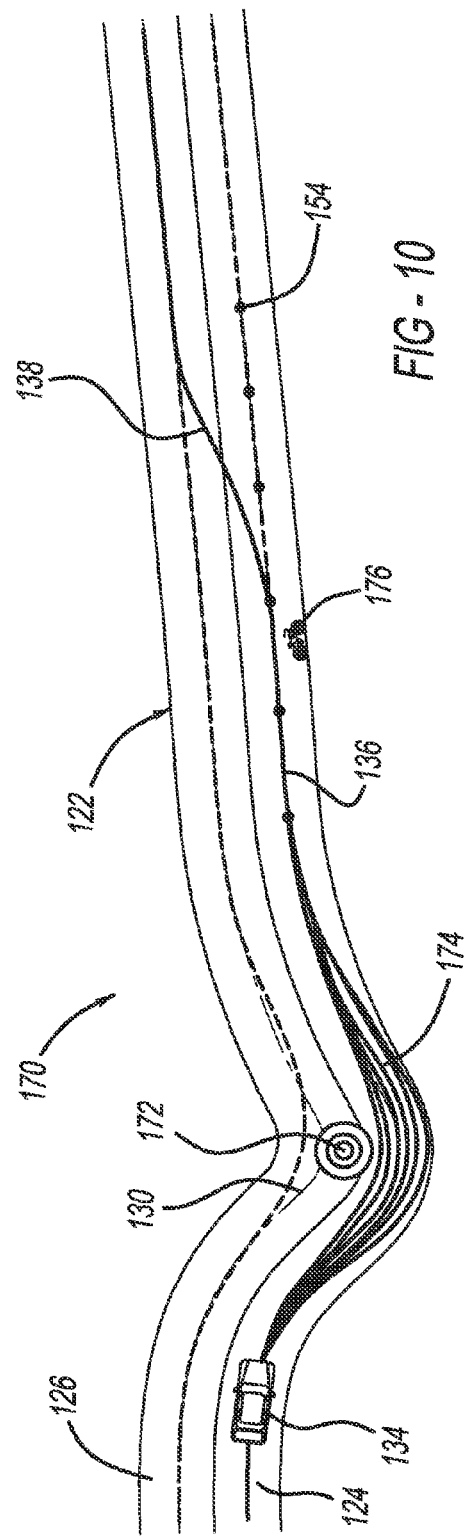
FIG. 10 is another representation of a roadway showing path changes for obstacle avoidance.

Also, at the box 144, the vehicle 134 may need to make speed and heading corrections because of an object in front of the vehicle 134. FIG. 10 is an illustration 170 of the roadway 122 and including a static object 172, such as an orange barrel, in the curve 132, where the calculated reference path 136 may cause the vehicle 134 to travel to close to the object 172. The object 172 is detected by any suitable sensor on the vehicle 134 and is provided as an input to the path generation algorithm. The algorithm generates multiple paths 174 around the object 172, where each candidate path $n_i^*$ is evaluated to determine if it is the optimal path to avoid the object 172 while allowing the vehicle 134 to stay comfortably within the lane 124 and as close to reference path 136 as possible. More particularly, the algorithm selects a candidate path $n_i^*$ that is a predetermined distance, such as 10 cm, away from the desired referenced path 136 and away from the object 172 in a sequence of calculations to determine which of those candidate paths will be the optimal path for the vehicle 134 that is a safe distance away from the object 172, but is the closest path to the original calculated path 136. The optimal candidate path $n_i^*$ is the path that minimizes the cost function:

$$\underset{n_i^* \in N_i}{\text{argmin}} \sum_{i=1}^{N-1} E(n_i^*, n_{i+1}^*) + \sum_{i=1}^{N} N(n_i^*), \quad (69)$$

where:

$$E(n_i^*, n_{i+1}^*) = \omega_{lateral} \cdot C_{lateral} + \delta_{collision\text{-}static}, \quad (70)$$

$$N(n_i^*) = \omega_{offset} \cdot C_{offset}, \quad (71)$$

and where $n_i^*$ is the optimal node at station layer N, $E(n_i^*, n_{i+1}^*)$ is the cost associated with the path 174 connecting the optimal nodes $n_i^*$ and $n_{i+1}^*$, $N(n_i^*)$ is the cost associated with the spatial point visited at the node $n_i^*$, $C_{lateral}$ and $\omega_{lateral}$ are the cost and weight, respectively, for the lateral vehicle maneuver, $\delta_{collision\text{-}static}$ is the cost for a collision with the static object 172, and $C_{offset}$ and $\omega_{offset}$ are the cost and the weight, respectively, for deviation from the reference path 136.

Figure 11:
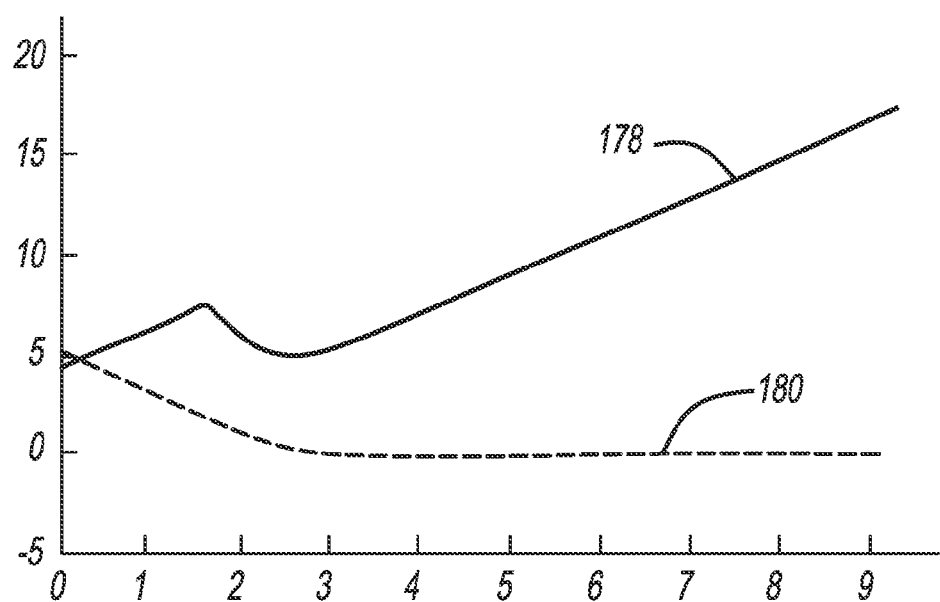
FIG. 11 is a graph with time on the horizontal axis and speed on the vertical axis showing an original speed profile of the vehicle and an adjusted speed profile of the vehicle.

In another situation, a moving object 176, such as a bicycle or pedestrian, may be detected by the vehicle sensors 16 in front of the vehicle 134, where the algorithm will adjust the speed of the vehicle 134 to avoid the object 176. FIG. 11 is a graph with time on the horizontal axis and speed on the vertical axis showing an original calculated speed profile represented by graph line 178 of the vehicle 134, which would cause the vehicle 134 to collide with the object 176, and an adjusted speed profile represented by graph line 180, that reduces the speed of the vehicle 134 to avoid the object 176.

As above, a cost function is employed to determine the optimal speed for the vehicle 134 for that maneuver as follows. In this process, the algorithm generates multiple candidate speed profiles $n_i^*$ that avoid the object 176, and evaluates each candidate speed profile $n_i^*$ using the cost function in equation (72). More particularly, the algorithm reduces the speed of the vehicle 134 to be less than the calculated reference speed, whether it be from the extreme speed profile or the comfort speed profile as determined above, some predetermined amount, such as 1 mph, to determine the optimal speed that matches the desired speed profile and safely avoids the object 176. The algorithm finds the optimal speed profile that minimizes the cost function.

$$\underset{n_i^* \in N_i}{\text{argmin}} \sum_{i=1}^{N-1} E(n_i^*, n_{i+1}^*) + \sum_{i=1}^{N} N(n_i^*), \quad (72)$$

where:

$$E(n_i^*, n_{i+1}^*) = \omega_{acc} \cdot C_{acc} + \delta_{collision\text{-}moving}, \quad (73)$$

$$N(n_i^*) = \omega_{offset} \cdot C_{offset}, \quad (74)$$

and where $n_i^*$ is the optimal node at station layer N, $E(n_i^*, n_{i+1}^*)$ is the cost associated with the speed change connecting the optimal nodes $n_i^*$ and $n_{i+1}^*$, $N(n_i^*)$ is cost associated with the speed visited at the node $n_i^*$, $C_{acc}$ and $\omega_{acc}$ are the cost and weight, respectively, for the longitudinal acceleration maneuver, $\delta_{collision\text{-}moving}$ is the cost for a collision with the object 176 and $C_{offset}$ and $\omega_{offset}$ are the cost and the weight, respectively, for deviation from the reference speed profile path.

At the box 146, the camera data is provided to fine tune the reference path 136 that the vehicle 134 is currently on based on the discussion above depending on what traffic situation the vehicle 134 is currently in. Particularly, the algorithm imports the measurements from the camera 14 and more accurately calculates the reference path 136 within the range of the camera 14 to make fine tuning corrections to put the vehicle 134 back on the reference path 136 if it deviates therefrom.

Figure 12:
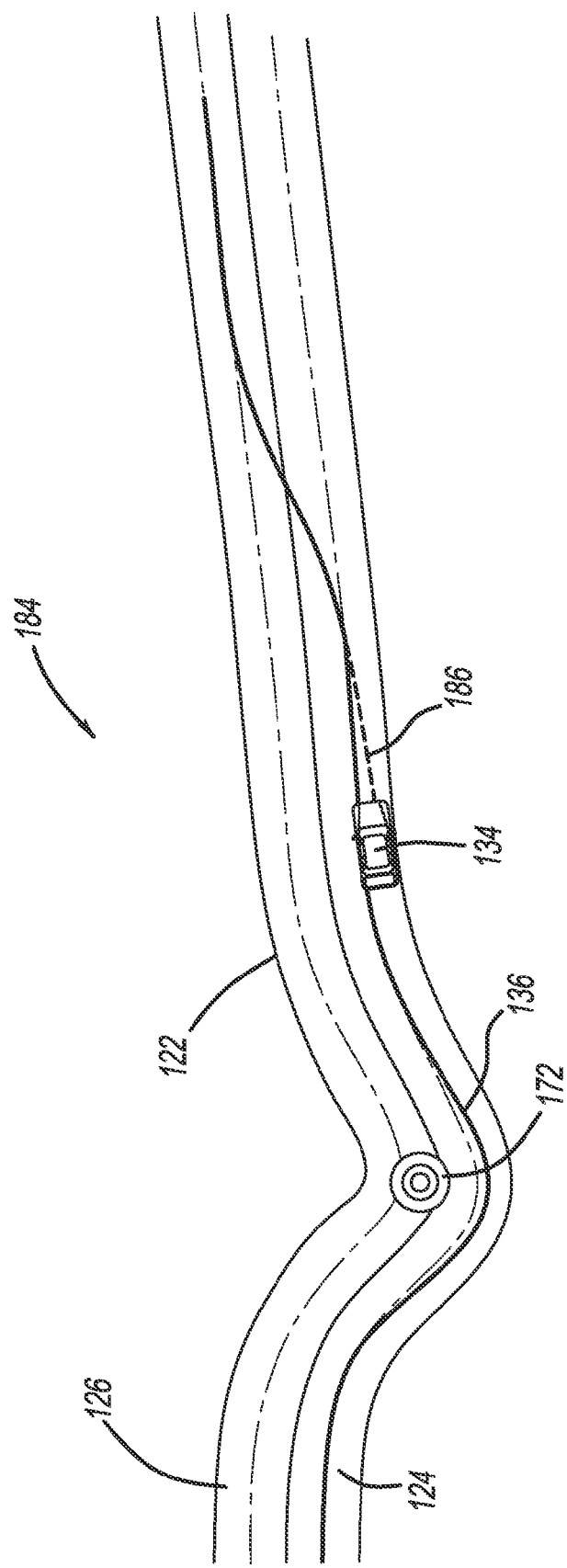
FIG. 12 is a representation of a roadway showing a short segment pathway to bring the vehicle back to a reference path.

FIG. 12 is an illustration 184 similar to the illustration 170, where like elements are identified by the same reference numbers, illustrating how the vehicle 134 gets back on the reference path 136 using measurements from the camera 14. Particularly, the algorithm calculates a short path segment 186 if the vehicle 134 deviates from the reference path 136 to return the vehicle 134 to the reference path 136 and the desired speed using a local close-loop trajectory modeled including a fifth-order polynomial path model and a third-order polynomial speed model as:

$$y = a_5 x^5 + a_4 x^4 + a_3 x^3 + a_2 x^2 + a_1 x + a_0, \quad (75)$$

$$v(t) = q_0 + q_1 t + q_2 t^2 + q_3 t^3. \quad (76)$$

where the unknowns ($q_0$, $q_1$, $q_2$, $q_3$) in equation (76) are determined from:

$$q_0 = v_0, \tag{77}$$

$$q_1 = a_0, \tag{78}$$

$$q_2 = \frac{3v_f - 3v_0}{t_f^2} - \frac{(2a_0 + a_f)}{t_f}, \tag{79}$$

$$q_3 = \frac{2(v_0 - v_f)}{t_f^3} + \frac{(a_0 + a_f)}{t_f^2}, \tag{80}$$

where $v_o$ and $a_o$ are the current speed and the current acceleration, respectively, and $v_f$ and $a_f$ are the desired speed and the acceleration, respectively, at time $t_f$.

Applying the lane geometry and the vehicle motion measurements, the path and speed models will be calculated at every time step to find the values $a_0$, $a_1$, $a_2$, $a_3$, $a_4$ and $a_5$, and $q_0$, $q_1$, $q_2$, and $q_3$.

Figure 13:
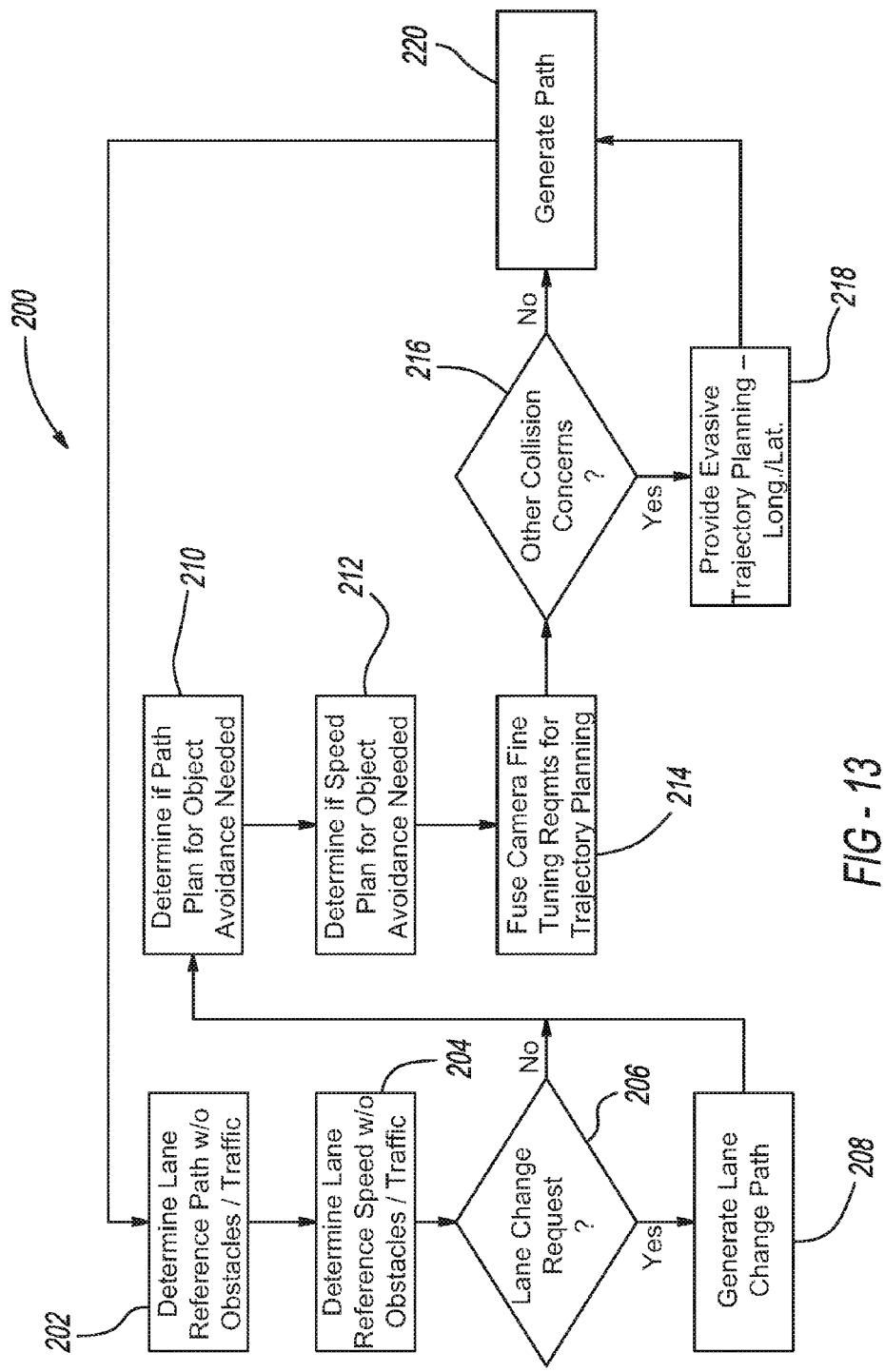
FIG. 13 is a flow chart diagram showing a process for taking evasive maneuvers in a path prediction process.

FIG. 13 is a flow chart diagram 200 showing one process based on the discussion above. For the box 142, the algorithm determines the lane reference path optimization at box 202 for the desired reference path 136 based on the roadway points 154 from the map database 20 without any obstacles or traffic in front of the vehicle 134 and determines the lane reference speed at box 204 for the same situation. The algorithm then determines whether there has been a lane change request at decision diamond 206 for the box 144, and if so, generates the lane change path 138 at box 208 in the manner discussed above. If the lane change path 138 has been generated at the box 208 or there has been no request for a lane change at the decision diamond 206, the algorithm then determines whether any lateral path planning for static object avoidance is required at box 210 and whether any longitudinal speed planning is required for object avoidance at box 212. Once all of these adjustments have been made, the algorithm proceeds to box 214 to fuse the camera fine tuning requirements in a closed-loop trajectory planning process at the box 146. The algorithm then determines at decision diamond 216 whether there is any other collision concerns provided by other algorithms operating on the vehicle 134, and if so, provides evasive trajectory planning using longitudinal and/or lateral vehicle control at box 218. Otherwise, the algorithm generates the path 136 at box 220.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for generating a desired path for a vehicle to follow along a roadway, said vehicle including a map database and a lane detection system, said method comprising:
providing roadway measurement values from the map database to a controller including a processor and a memory, where the roadway measurement values identify locations on the roadway;
adjusting positions of the roadway measurement values relative to the roadway, in the memory, so that adjacent roadway measurement values are substantially an equal distance apart;
determining, using the controller, a reference path using the roadway measurement values for the vehicle to follow along the roadway;
determining, using the controller, a reference speed of the vehicle from a posted roadway speed from the map database;
determining, using the controller, that an object creates a potential collision problem with the vehicle on the reference path and at the reference speed;
adjusting, using the controller, the reference path and/or the reference speed to avoid the object;
determining a short segment path that will bring the vehicle back to the reference path, including modeling a local closed-loop trajectory as a fifth-order polynomial path model and a third-order polynomial speed model; and
providing signals from the controller to a vehicle brake system, a throttle and a steering system to cause the vehicle to follow the reference path and the reference speed.

2. The method according to claim 1 further comprising reducing a curvature of the reference path to generate a reduced curvature reference path that reduces turning requirements of the vehicle.

3. The method according to claim 2 wherein reducing the curvature of the reference path includes minimizing a cost function where the roadway measurement values are selectively adjusted at high curvature locations along the reference path.

4. The method according to claim 3 wherein minimizing the cost function includes minimizing the cost function as:

$$\underset{P \in P}{\text{argmin}} \; \omega_{smooth} \cdot \Sigma_{p_i \in P} \frac{p_i - p_{i-1}}{|p_i - p_{i-1}|} \cdot \frac{p_i - p_{i+1}}{|p_i - p_{i+1}|} + \omega_{length} \cdot \Sigma_{p_i \in P} |p_i - p_{i-1}|,$$

where $p_i$ is the ith sample point and $\omega_{smooth}$ is a weight for a path smoothness term:

$$\Sigma_{p_i \in P} \frac{p_i - p_{i-1}}{|p_i - p_{i-1}|} \cdot \frac{p_i - p_{i+1}}{|p_i - p_{i+1}|},$$

and where $\omega_{length}$ is a weight for a path length term:

$$\Sigma_{p_i \in P} |p_i - p_{i-1}|.$$

5. The method according to claim 1 wherein determining the reference speed includes identifying a roadway curvature value at each roadway measurement value and for each roadway measurement value determining the reference speed as:

$$v_i = \min\left(V^{speed\text{-}limt}, \sqrt{\frac{a_y^{limit}}{\kappa_i}}\right),$$

where if:

$$(v_{i+1}^2)/(2 \cdot s_i) \geq a_{x+}^{limit},$$

then:

$$v_{i+1} = \sqrt{v_i^2 + 2 \cdot s_i \cdot a_{x+}^{limit}},$$

and if:

$$(v_i^2 - v_{i+1}^2)/(2 \cdot s_i) \geq a_{x-}^{limit},$$

then:

$$v_i = \sqrt{v_{i+1}^2 + 2 \cdot s_i \cdot a_{x-}^{limit}},$$

where $v_i$ is the reference speed, $V^{speed\text{-}limt}$ is the posted roadway speed, $\kappa$ is the roadway curvature value, $s_i$ is the distance between adjacent roadway measurement values, and $a_y^{limit}$, $a_{x+}^{limit}$ and $a_{x-}^{limit}$ are vehicle lateral and longitudinal acceleration limits.

6. The method according to claim 1 further comprising identifying that a request for a lane change has been made and performing a lane change maneuver by directing the reference path into an adjacent lane.

7. The method according to claim 1 wherein determining that an object creates a potential collision problem includes determining that a static object is a predetermined distance from the reference path and determining a modified reference path a desired distance from the static object.

8. The method according to claim 7 wherein determining the modified reference path a desired distance from the static object includes identifying multiple candidate modified reference paths and minimizing a cost function to determine an optimum candidate modified reference path.

9. The method according to claim 1 wherein determining that an object creates a potential collision problem includes determining that a moving object is in front of the vehicle in the roadway and adjusting the reference speed to avoid the moving object.

10. The method according to claim 9 wherein adjusting the reference speed includes identifying multiple candidate speeds and minimizing a cost function that selects one of the multiple candidate speeds that is close to the reference speed.

11. The method according to claim 1 further comprising providing roadway measurement values from a camera onboard the vehicle that identify locations on the roadway and using the roadway measurement values from the camera to determine that the vehicle has deviated from the reference path.

12. A method for generating a desired path for a vehicle to follow along a roadway, said vehicle including at least one forward-looking camera, a lane detection system and a map database, said method comprising:

providing roadway measurement values from the map database and/or the lane detection system to a controller including a processor and a memory, where the roadway measurement values identify locations on the roadway;

adjusting positions of the roadway measurement values relative to the roadway, in the memory, so that adjacent roadway measurement values are substantially an equal distance apart;

determining, using the controller, a reference path using the roadway measurement values for the vehicle to follow along the roadway;

reducing the curvature of the reference path, using the controller, to generate a reduced curvature reference path that reduces the turning requirements of the vehicle;

providing roadway values from the camera to the controller that identify locations on the roadway and using the roadway values from the camera to determine that the vehicle has deviated from the reference path;

determining, using the controller, a short segment path that will bring the vehicle back to the reference path, where determining a short segment path includes modeling a local closed-loop trajectory as a fifth-order polynomial path model and a third-order polynomial speed model;

determining, using the controller, a reference speed of the vehicle from a posted roadway speed from the map database;

determining, using the controller, that an object creates a potential collision problem with the vehicle on the reference path and at the reference speed;

adjusting, using the controller, the reference path and/or the reference speed to avoid the object; and providing signals from the controller to a vehicle brake system, a throttle and a steering system to cause the vehicle to follow the reference path and the reference speed.

13. The method according to claim 12 wherein determining that an object creates a potential collision problem includes determining that a static object is a predetermined distance from the reference path and determining a modified reference path a desired distance from the static object.

14. The method according to claim 12 wherein determining that an object creates a potential collision problem includes determining that a moving object is in front of the vehicle in the roadway and adjusting the reference speed to avoid the moving object.

15. A method for generating a desired path for a vehicle to follow along a roadway, said vehicle including a map database and a lane detection system, said method comprising:

providing roadway measurement values from the map database to a controller including a processor and a memory, where the roadway measurement values identify locations on the roadway;

adjusting positions of the roadway measurement values relative to the roadway, in the memory, so that adjacent roadway measurement values are substantially an equal distance apart;

determining, using the controller, a reference path using the roadway measurement values for the vehicle to follow along the roadway;

reducing a curvature of the reference path to generate a reduced curvature reference path that reduces turning requirements of the vehicle, wherein reducing the curvature of the reference path includes minimizing a cost function where the roadway measurement values are selectively adjusted at high curvature locations along the reference path, and the cost function is modeled as:

$$\underset{P \in P}{\mathrm{argmin}} \; \omega_{smooth} \cdot \sum_{p_i \in P} \frac{p_i - p_{i-1}}{|p_i - p_{i-1}|} \cdot \frac{p_i - p_{i+1}}{|p_i - p_{i+1}|} + \omega_{length} \cdot \sum_{p_i \in P} |p_i - p_{i-1}|,$$

where $p_i$ is the ith sample point and $\omega_{smooth}$ is a weight for a path smoothness term:

$$\sum_{p_i \in P} \frac{p_i - p_{i-1}}{|p_i - p_{i-1}|} \cdot \frac{p_i - p_{i+1}}{|p_i - p_{i+1}|},$$

and where $\omega_{length}$ is a weight for a path length term:

$$\Sigma_{p_i \in P} |p_i - p_{i-1}|.$$

determining, using the controller, a reference speed of the vehicle from a posted roadway speed from the map database;

determining, using the controller, that an object creates a potential collision problem with the vehicle on the reference path and at the reference speed;

adjusting, using the controller, the reference path and/or the reference speed to avoid the object; and providing signals from the controller to a vehicle brake system, a throttle and a steering system to cause the vehicle to follow the reference path and the reference speed.

\* \* \* \* \*